Patented Oct. 19, 1943

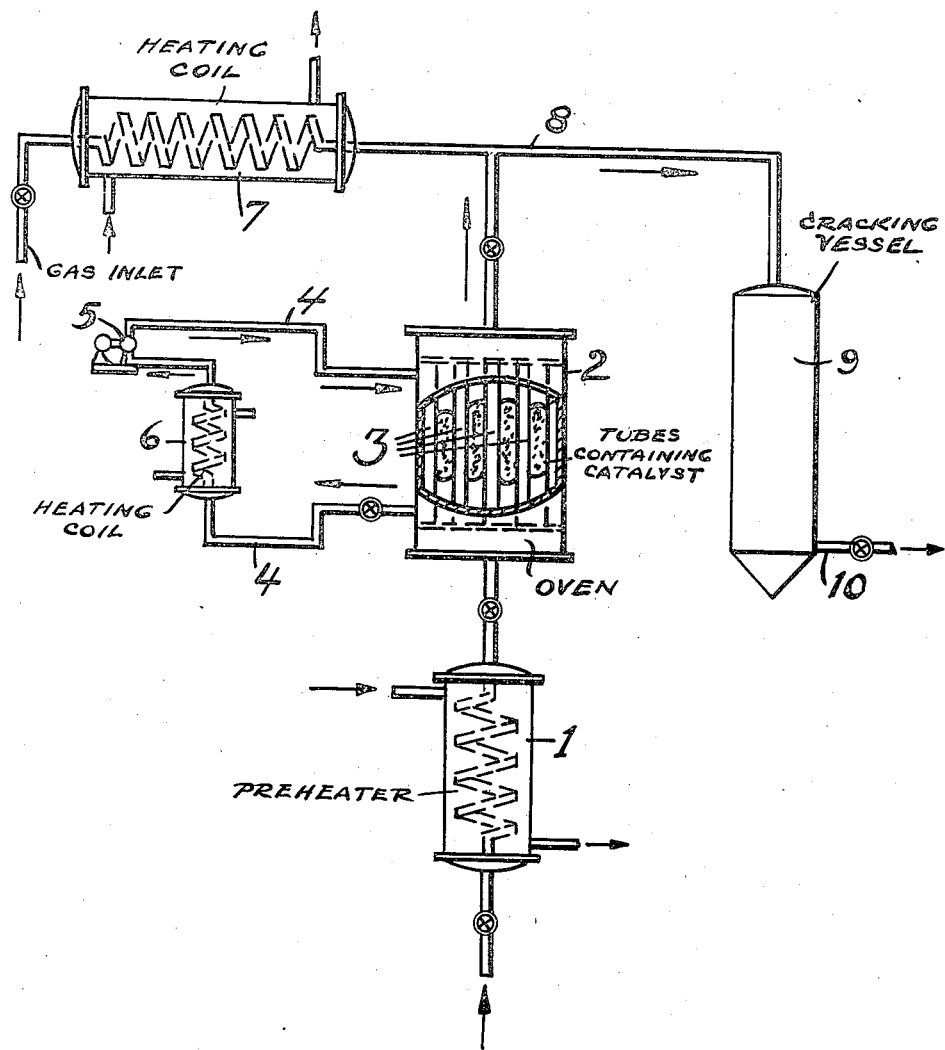

2,331,930

UNITED STATES PATENT OFFICE 2,331,930

SPLITTING OF HYDROCARBONS

Mathias Pier, Heidelberg, and Kurt Peters and Gerhard Free, Ludwigshafen-on-the-Rhine, Germany; vested in the Alien Property Custodian Application February 15, 1939, Serial No. 256,506
In Germany February 28, 1938

6 Claims. (Cl. 196—49)

The present invention relates to the conversion of higher boiling hydrocarbons into those of lower boiling point by splitting.

It has already been proposed to carry out the splitting of liquid hydrocarbons, such as petroleums, tars or their fractions into products of lower boiling point in the presence of catalysts. It has been found that within the layer of catalyst through which the substance to be split is led there occur, after the original endothermic course of the reaction, sudden exothermic reactions which cause an overheating and consequently a strong splitting up into gaseous hydrocarbons and an increased separation of high molecular weight substances and which furthermore impair the activity of the catalyst.

We have now found that by maintaining a sufficiently high throughput or by varying the throughput or by suitable choice of the thickness of the layer of catalyst, the exothermic reaction in the presence of the catalyst can be kept within such limits that no disadvantageous actions take place. In particular the gasification is very greatly reduced in this way. Instead of the gaseous cleavage products and in part instead of the cleavage products of low boiling point there are obtained mainly hydrocarbons having more carbon atoms in the molecule; the average boiling point is displaced upwards. According to this invention the thickness of the layer of catalyst is chosen only so great and/or the throughput of the initial materials is so dimensioned that within the layer endothermic reactions preferentially occur and the cleavage products leave the layer of catalyst at a point in time at which the exothermic reaction begins or at a point in time at which the commencing exothermic reaction still does not cause any injurious separation of carbon in the last part of the layer of catalyst, i. e. the hydrocarbons are not treated in the presence of the catalyst for a time which materially exceeds the point at which the exothermic reaction begins. When for example in the usual method of working an undesirable rise in temperature or a deposition of carbon takes place after the second third of the catalyst layer, the throughput is increased by about one-half or the catalyst layer is reduced by one third. In the state of highest reactivity, the reaction products thereupon enter a space free from catalyst in which the further splitting takes place by the supply of a strongly heated gas. The specific time to be employed for the splitting in the presence of a catalyst according to the present invention depends on various factors, in particular on the activity of the catalyst employed, on the nature of the initial oil and on the temperature and pressure employed. At the usual temperatures of about from 400° to 500° C. the time of exposure may range for example between 10 seconds and 10 minutes when the conversion is carried out in the presence of a substance having a good catalytic activity, as for example in the presence of aluminum silicates.

The accompanying drawing diagrammatically illustrates the manner in which the present process can be carried out but is not to be interpreted as a limitation thereto.

The oil is preheated in heating coil 1 and passed through pipes 3 in oven 2. Pipes 3 contain catalysts and are swept by a heating gas circulated through the oven by means of pipe system 4, pump 5 and heating coil 6. The product which issues from the upper end of oven 2 is mixed at junction 8 with a gas which has been preheated by means of heating coil 7 and is introduced, together with this gas, into cracking vessel 9. The cracking products issue from this vessel at 10 and are then worked up in the customary manner.

Catalysts which favor the splitting are chosen, as for example aluminum silicates or alumina, as for example fuller's earth, Florida earth, Terrana, bauxite or bleaching earths which have been pretreated with acids, such as hydrofluoric acid, heavy metal oxides or sulphides, in particular the oxides or sulphides of iron, cobalt, nickel, manganese, molybdenum, chromium, tungsten, zinc and magnesium, which are advantageously applied to carriers.

The liquid hydrocarbons, such as petroleums, tars, pressure hydrogenation products, reduction products of carbon monoxide or their fractions, advantageously mixtures of products rich in hydrogen and products poor in hydrogen, as for example liquid carbon monoxide reduction products rich in hydrogen together with tar oils or with products obtained by extraction of coals under pressure or petroleum products poor in hydrogen, as for example those obtained as the fractions poor in hydrogen in a treatment with selective solvents, are led over the said catalysts at temperatures above 350°, in particular from 400° to 550° C. Upon the occurrence of an appreciable rise in temperature (about 20° above the average splitting temperature) and/or of undesirable deposition of carbon, the product is led into an attached reaction chamber free from catalyst into which hot gases are led for the further splitting. These hot gases may consist of inert gases, such as nitrogen, hydrogen, carbon monoxide, watergas or methane, which are preferably heated to temperatures above 800° C., as for example to from 900° to 1200° C., or also of highly heated gaseous hydrocarbons having more than one carbon atom, such as ethane, propane or butane, which at the said temperatures react with the cleavage products of the oils or can be polymerized and simultaneously improve the properties of the cleavage products by the resulting polymerized hydrocarbons. The inert portions of the cleavage products of the said gaseous hydrocarbons may, however, also be led in a highly heated state into the splitting chambers. The gaseous hydrocarbons formed by the catalytic splitting of the liquid initial materials may also be used for further splitting after preheating. It is also possible first to introduce into the splitting chamber behind the catalyst zone strongly heated inert gases and then gaseous olefines kept at a lower temperature, polymerization catalysts, such as phosphoric acid or metal halides having a condensing action being present in the last part of the splitting chamber if desired.

The following example will further illustrate the nature of this invention but the invention is not restricted to this example.

*Example*

A middle oil obtained from German petroleum is led in the vapor phase at 470° C. in an amount of 15 liters per hour through a reaction chamber of 10 liters capacity charged with an aluminum silicate layer of 1 meter thickness and then into a chamber of 10 liters capacity free from catalyst into which are led 5 kilograms per hour of a cracking gas heated to 950° C. which contains saturated and unsaturated hydrocarbons in addition to hydrogen. A product is formed containing 70 per cent by weight of non-knocking motor benzine; the remainder is an excellent Diesel oil. Only insignificant amounts of gas are formed.

If the catalyst layer be longer by about one-half, the gasification is several times as much with the same yield of benzine.

The cracking gas may be returned to the reaction after the separation of methane and hydrogen.

What we claim is:

1. A process for the conversion of higher boiling hydrocarbons into normally liquid hydrocarbons of lower boiling point which comprises passing the said higher boiling hydrocarbons at a temperature ranging between about 400° and 550° C. within such a restricted time ranging between about 10 seconds and 10 minutes over an active silicate so that only a non-exothermic reaction but no substantial exothermic reaction takes place and then without substantially reducing the temperature of the resulting hydrocarbons, further splitting the same in the absence of a catalyst and in the presence of an added gas, preheated to a temperature between 800 and 1200° C., which is selected from the group consisting of hydrocarbon gases and gases having a reducing action.

2. A process for the conversion of higher boiling hydrocarbons into normally liquid hydrocarbons of lower boiling point which comprises passing the said higher boiling hydrocarbons at a temperature ranging between about 400 and 550° C. within such a restricted time ranging between about ten seconds and ten minutes over an active alumina so that only a non-exothermic reaction but no substantial exothermic reaction takes place and then without substantially reducing the temperature of the resulting hydrocarbons, further splitting the same in the absence of a catalyst and in the presence of an added gas, preheated to a temperature between 800 and 1200° C., which is selected from the group consisting of hydrocarbon gases and gases having a reducing action.

3. A process for the conversion of higher boiling hydrocarbons into normally liquid hydrocarbons of lower boiling point which comprises passing the said higher boiling hydrocarbons at a temperature ranging between about 400 and 550° C. within such a restricted time ranging between about ten seconds and ten minutes over an active silicate so that only a non-exothermic reaction but no substantial exothermic reaction takes place and then without substantially reducing the temperature of the resulting hydrocarbons, further splitting the same in the absence of a catalyst and in the presence of an added inert gas preheated to a temperature between 800 and 1200° C.

4. A process for the conversion of higher boiling hydrocarbons into normally liquid hydrocarbons of lower boiling point which comprises passing the said higher boiling hydrocarbons at a temperature ranging between about 400 and 550° C. within such a restricted time ranging between about ten seconds and ten minutes over an active alumina so that only a non-exothermic reaction but no substantial exothermic reaction takes place and then without substantially reducing the temperature of the resulting hydrocarbons, further splitting the same in the absence of a catalyst and in the presence of an added inert gas, preheated to a temperature between 800 and 1200° C.

5. A process for the conversion of higher boiling hydrocarbons into normally liquid hydrocarbons of lower boiling point, which comprises initiating the cracking of the said higher boiling hydrocarbons by passing them at a splitting temperature over a splitting catalyst for such a time that only a non-exothermic reaction but no substantial exothermic reaction takes place, mixing said hydrocarbons, after they have left the catalyst, with a gas heated to a temperature substantially higher than that of the hydrocarbons and then without substantially diminishing the heat contained in such hydrocarbons further splitting such hydrocarbons in the absence of a catalyst.

6. In the process as claimed in claim 5 wherein said gas heated to a temperature substantially higher than that of the hydrocarbons is a highly heated gaseous hydrocarbon.

MATHIAS PIER.
KURT PETERS.
GERHARD FREE.